(12) United States Patent
Kim (10) Patent No.: US 7,601,275 B2
(45) Date of Patent: Oct. 13, 2009

(54) LIQUID CRYSTAL DROP APPARATUS AND METHOD FOR DROPPING LIQUID CRYSTAL USING THE SAME

(75) Inventor: Young Suk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 454 days.

(21) Appl. No.: 11/431,649

(22) Filed: May 11, 2006

(65) Prior Publication Data

US 2006/0257587 A1 Nov. 16, 2006

(30) Foreign Application Priority Data

May 11, 2005 (KR) .................. 10-2005-0039403

(51) Int. Cl.
*G02F 1/03* (2006.01)
*G03C 5/18* (2006.01)
*G03C 5/26* (2006.01)
*C09K 19/52* (2006.01)
*C09K 19/00* (2006.01)

(52) U.S. Cl. .................. 252/299.01; 430/20; 430/449; 428/1.1

(58) Field of Classification Search .................. 430/20, 430/449; 428/1.1; 252/299.01
See application file for complete search history.

(56) References Cited

U.S. PATENT DOCUMENTS 7,407,553 B2 *  8/2008  Jung et al. .................. 118/313
7,436,483 B2 * 10/2008  Byun et al. .................. 349/187

FOREIGN PATENT DOCUMENTS

| CN | 1439912 | 9/2003 |
| JP | 2003-057666 | 2/2003 |
| JP | 2003-91010 | 3/2003 |

* cited by examiner

*Primary Examiner*—Geraldina Visconti
(74) *Attorney, Agent, or Firm*—Morgan, Lewis & Bockius LLP (57) ABSTRACT

A liquid crystal drop apparatus for dropping liquid crystal on a substrate includes a liquid crystal container filled with liquid crystal, a nozzle formed at an lower end of the liquid crystal container for dropping the liquid crystal of the liquid crystal container, and a control unit for controlling the nozzle when the nozzle drops the liquid crystal.

4 Claims, 7 Drawing Sheets

LIQUID CRYSTAL DROP APPARATUS AND METHOD FOR DROPPING LIQUID CRYSTAL USING THE SAME

This application claims the benefit of Korean Patent Application No. 2005-0039403, filed in Korea on May 11, 2005, which is hereby incorporated by reference.

BACKGROUND OF THE INVENTION

1. Field of the Invention

The present invention relates to an apparatus for a liquid crystal display (LCD) device, and more particularly, to a liquid crystal drop apparatus, which is capable of finely adjusting the amount of liquid crystal dropped on a substrate of the LCD device, and a method for dropping liquid crystal using the same.

2. Discussion of the Related Art

In general, the LCD device has a lot of advantages, such as a low operating voltage, a low power consumption rate, realization of full colors, a light weight, a thin profile, and miniaturization. For this reason, the LCD devices have been widely applied to various fields, from a clock, a calculator, a monitor for PCs, and a notebook computer to a TV, an aeronautical monitor, a mobile terminal, and a portable phone. A typical LCD device includes an LCD panel for displaying an image and a circuit unit for driving the LCD panel. The LCD panel further includes a first substrate having a TFT array formed thereon, a second substrate having a color filter array formed thereon, and a liquid crystal layer formed between the first and second substrates.

On the first substrate of the LCD panel, a plurality of gate lines are arranged at regular intervals in one direction, and a plurality of data lines are arranged at regular intervals in a direction vertical to the gate lines, thereby defining pixel regions. Moreover, a plurality of pixel electrodes are formed in the pixel regions for displaying an image. A plurality of TFTs are formed in the pixel regions at the intersections between the gate lines and the data lines, and are switched on/off by driving signals of the gate lines for transferring image signals of the data lines to the pixel electrodes. On the second substrate of the LCD panel, a black matrix layer is formed for blocking light at portions except for the pixel regions, and an R, G, and B color filter layer is formed at portions corresponding to the pixel regions for expressing colors. Moreover, a common electrode is formed on the entire surface of the second substrate including the color filter layer. In an In Plane Switching (IPS) mode liquid crystal display device, the common electrode may be formed on the first substrate. The first and second substrates are bonded to each other with a designated space formed therebetween, and the liquid crystal layer is formed in the designated space.

Figure 1:
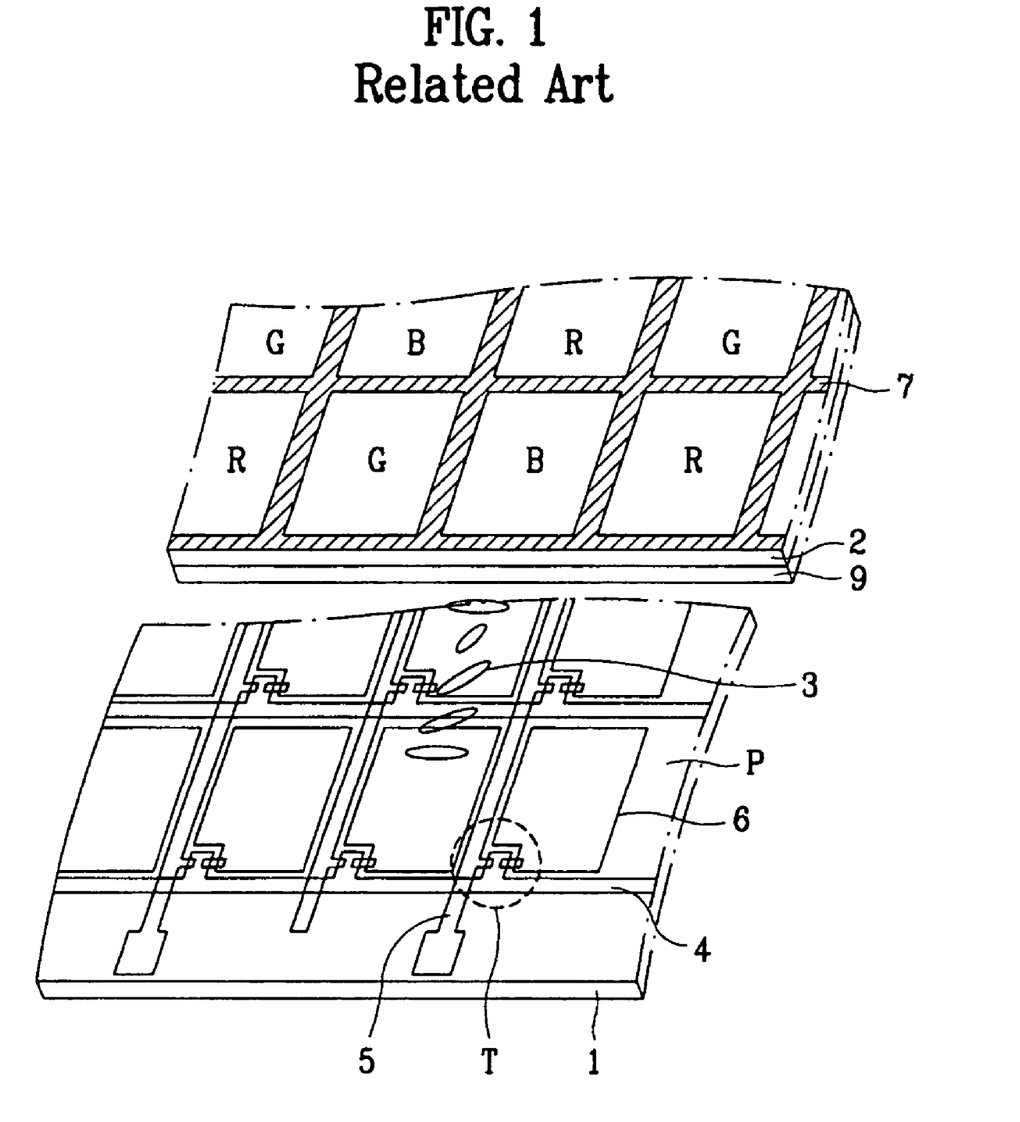
FIG. 1 is an exploded perspective view of a liquid crystal display (LCD) device according to the related art.

Typically, the liquid crystal layer is formed by either a liquid crystal injection method or a liquid crystal drop method according to the related art. A process for manufacturing the LCD panel is varied in the related art methods. FIG. 1 is an exploded perspective view schematically illustrating an LCD device according to the related art. As shown in FIG. 1, the related art LCD device includes a lower substrate 1 and an upper substrate 2, which are bonded to each other with a designated space formed therebetween, and a liquid crystal layer 3 injected into the designated space between the lower substrate 1 and the upper substrate 2.

Specifically, on the lower substrate 1, a plurality of gate lines 4 are arranged at regular intervals in one direction and a plurality of data lines 5 are arranged at regular intervals in a direction vertical to the gate lines 4, thereby defining pixel regions (P). Moreover, a plurality of pixel electrodes 6 are formed in the pixel regions (P) in which the gate lines 4 and the data lines 5 intersect each other, and a plurality of TFTs (T) are formed at the intersections between the gate lines 4 and the data lines 5. On the upper substrate 2, a black matrix layer 7 is formed for blocking light at portions except for the pixel regions (P), an R, G, and B color filter layer (not shown) is formed for expressing colors, and a common electrode 9 is formed for forming an image.

Although not shown in FIG. 1, each of the TFTs (T) further includes a gate electrode protruded from the gate line 4, a gate insulating film formed on the entire surface of the lower substrate 1, an active layer formed on the gate insulating film on the upper portion of the gate electrode, a source electrode protruded from the data line 5, and a drain electrode opposite to the source electrode. The pixel electrodes 6 may be made of a transparent conductive metal with a high transmittance, such as Indium-Tin-Oxide (ITO).

In the above-described related art LCD device, the liquid crystal layer 3 located on the pixel electrodes 6 is oriented by signals applied from the TFTs (T), and the amount of light transmitted by the liquid crystal is adjusted by the degree of the orientation of the liquid crystal layer 3, thereby displaying an image on the LCD device.

Figure 2:
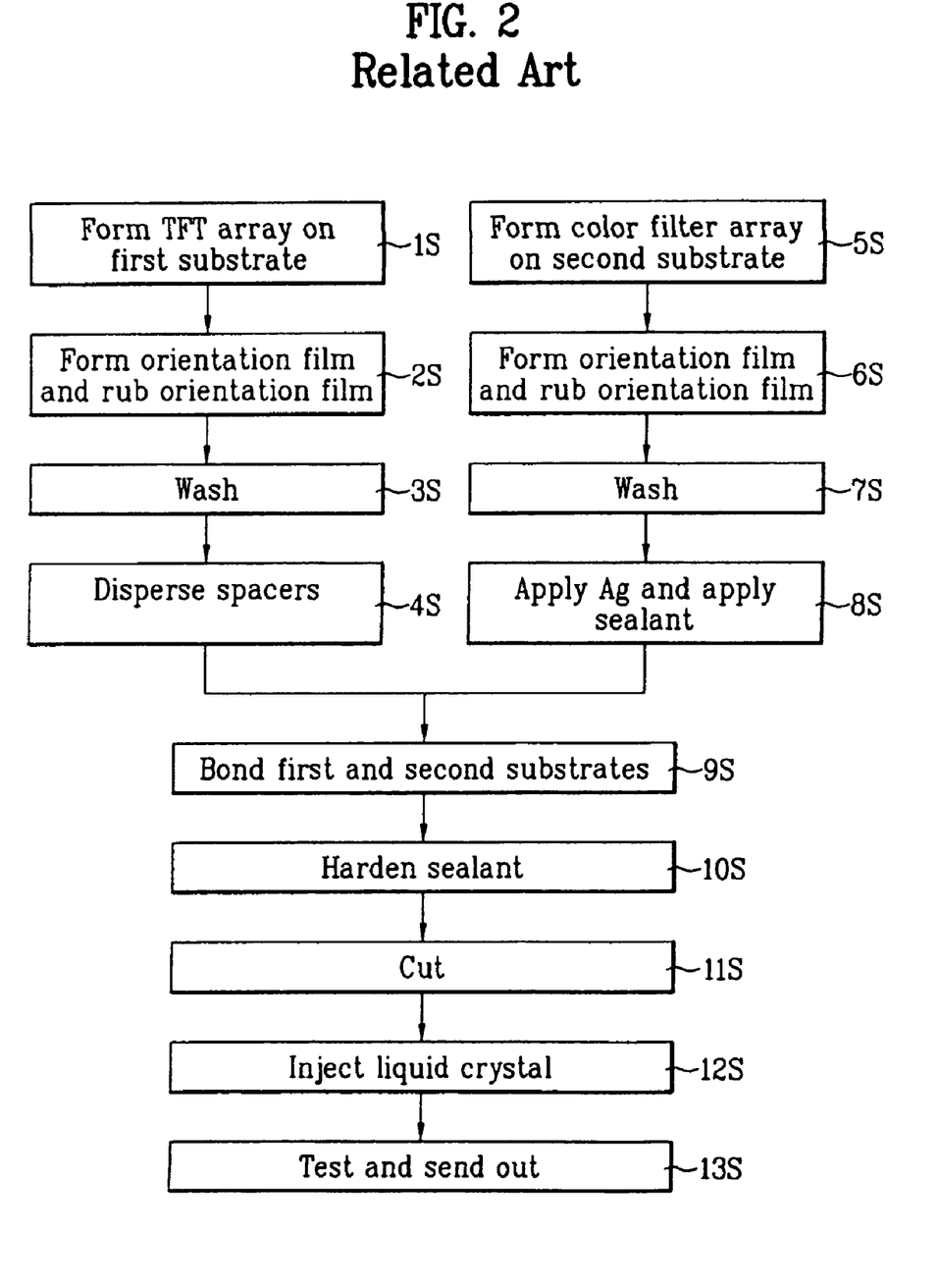
FIG. 2 is a flow chart schematically illustrating a method for manufacturing an LCD device using a liquid crystal injection method according to the related art.

FIG. 2 is a flow chart schematically illustrating a method for manufacturing an LCD device using the liquid crystal injection method according to the related art. As shown in FIG. 2, a TFT array is formed on a first substrate at Step 1S, and a color filter array (not shown) is formed on a second substrate at Step 5S. After that, at Steps 2S and 6S, orientation films for orienting liquid crystal are respectively formed on the first substrate and the second substrate, and are rubbed. Then, at Steps 3S and 7S, the first substrate and the second substrate are respectively washed. Thus, the first and second substrates are bonded to each other such that spacers for maintaining a cell gap for an LCD panel are dispersed on the first substrate at Step 4S, and Ag for connecting common lines with the common electrode and a sealant for bonding the first and second substrates are applied to the edge of the second substrate at Step 8S. Here, the applied sealant is patterned with a liquid crystal inlet.

At Step 9S, the first and second substrates are transferred into a bonding apparatus to complete the bonding of the first and second substrates. Thereafter, at Step 10S, the bonded first and second substrates are loaded in a hardening furnace (not shown) to harden the sealant. After the hardening of the sealant is completed, the bonded first and second substrates are cut into unit LCD panels by scribing and breaking processes at Step 11S. Thus, at Step 12S, the liquid crystal is injected into a space between the first and second substrate of each unit LCD panel through the liquid crystal inlet in a vacuum chamber, and then the liquid crystal inlet is sealed. Specifically, when the liquid crystal inlet is soaked in a liquid crystal solution under the condition that the space between the bonded first and second substrates is in a vacuum state, the liquid crystal is injected into the space due to an osmotic action. After the liquid crystal is injected into the space between the first and second substrate, the liquid crystal inlet is sealed using a sealant. Finally, the unit liquid crystal display panels are tested, and sent out at Step 13S.

In the related art liquid crystal injection method, since the liquid crystal inlet is soaked in the liquid crystal solution under the condition that the vacuum state in the space between the bonded first and second substrates is maintained, it is time-consuming to inject the liquid crystal, thereby deteriorating productivity. Moreover, when the liquid crystal is injected into the space between the bonded first and second substrates to manufacture a large-sized LCD panel, it is difficult to completely inject the liquid crystal into the large-sized LCD panel, thereby resulting in a poor quality LCD panel. For this reason, the LCD panels for portable phones or PDA phones are manufactured by the liquid injection method, whereas the large-sized LCD panels are manufactured by the liquid crystal drop method.

Figure 3:
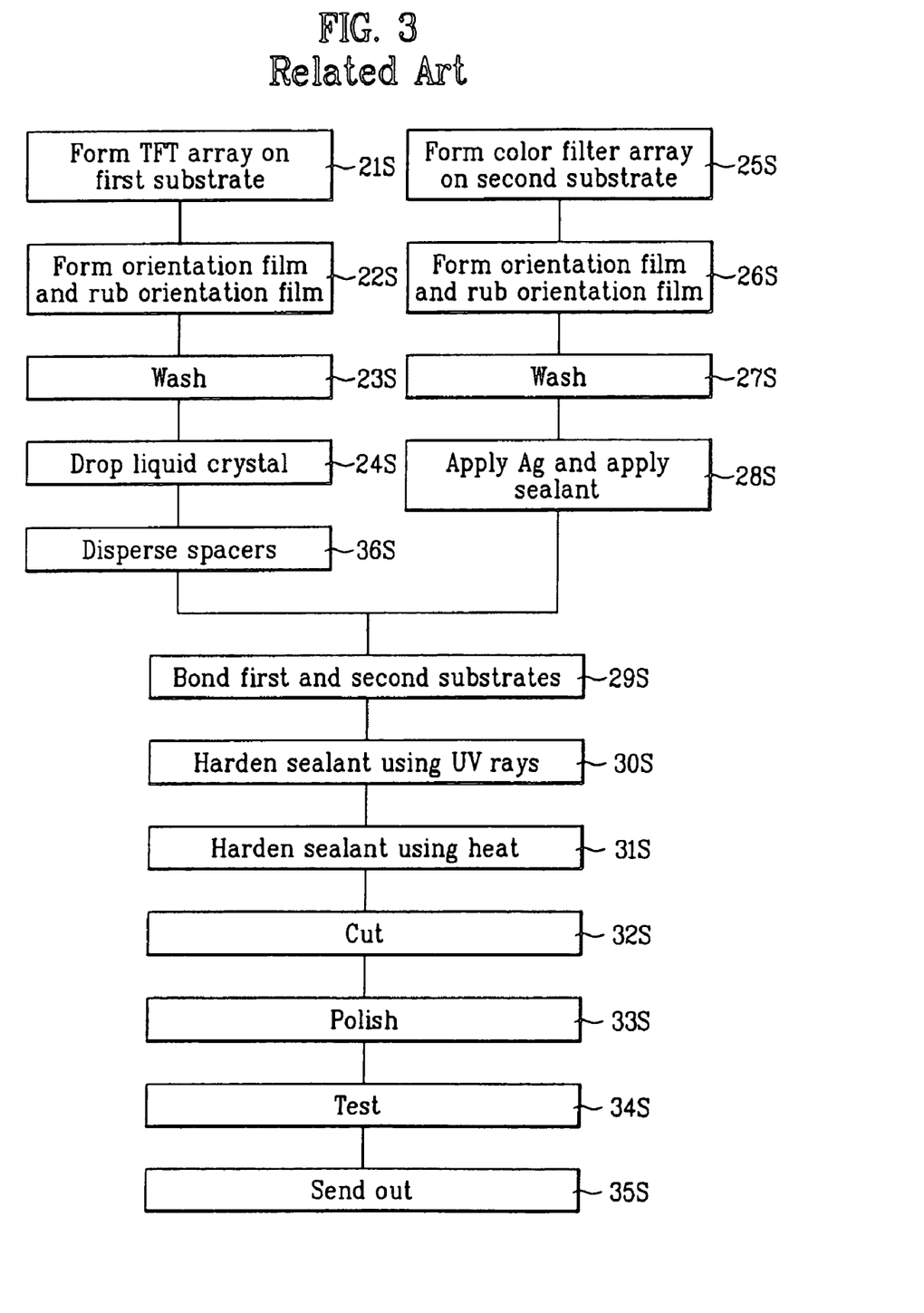
FIG. 3 is a flow chart schematically illustrating a method for manufacturing an LCD device using a liquid crystal drop method according to the related art.

Hereinafter, a method for manufacturing an LCD device using the liquid crystal drop method according to the related art will be described. FIG. 3 is a flow chart schematically illustrating the related art method for manufacturing the LCD device using the liquid crystal drop method. As shown in FIG. 3, a TFT array is formed on a first substrate at Step 21S, and a color filter array is formed on a second substrate at Step 25S. Then, at Steps 22S and 26S, orientation films for orienting liquid crystal are respectively formed on the first substrate and the second substrate, and are rubbed. After that, the first substrate and the second substrate are respectively washed at Steps 23S and 27S. Thus, at Step 24S, an adequate amount of the liquid crystal is dropped on the first substrate such that the liquid crystal is dropped at central portions of respective liquid crystal panel regions, without contacting a sealant until the sealant is completely hardened to maintain a cell gap. On the other hand, at Step 28S, the sealant and Ag balls are dispensed on the edges of the respective liquid crystal panel regions of the second substrates. Here, the sealant is independently patterned in the liquid crystal panel regions. At Step 36S, spacers are dispersed on the first substrate, on which the liquid crystal is dropped.

After that, at Step 29S, the first and second substrates are transferred into a vacuum bonding chamber (not shown), and are bonded to each other in the vacuum bonding chamber. Specifically, the second substrate is reversed so that the surface of the second substrate on which the sealant is deposited faces down, and is mounted on an upper stage of the vacuum bonding chamber, and the first substrate on which the liquid crystal is dropped is mounted on a lower stage of the vacuum bonding chamber. Then, the vacuum bonding chamber is evacuated to create a vacuum so that the first and second substrates are bonded to each other.

At Step 30S, the thus-bonded first and second substrates are loaded from the vacuum bonding chamber to a UV hardening furnace (not shown), and the sealant is hardened therein by irradiating UV rays onto the sealant. Specifically, a mask (not shown) having a light shading film is used on portions of the first and second substrates except for portions to which the sealant is applied, and the sealant is thus hardened by irradiating the UV rays onto the sealant. Further, at Step 31S, the bonded first and second substrates are loaded in a thermal hardening furnace, and the sealant is thermally hardened. At this time, the liquid crystal dropped on respective liquid crystal panels is spread.

After the UV hardening and the thermal hardening of the sealant are completed, the bonded first and second substrates are cut into unit liquid crystal display panels at Step 32S. Then, the unit liquid crystal display panels are polished at Step 33S, tested at Step 34S, and sent out at Step 35S.

As described above, the related art liquid crystal drop method can save time by dropping the liquid crystal on the substrate, thereby improving productivity and remedying the deficiencies caused by the incomplete injection of the liquid crystal into a large-sized LCD device.

Figure 4:
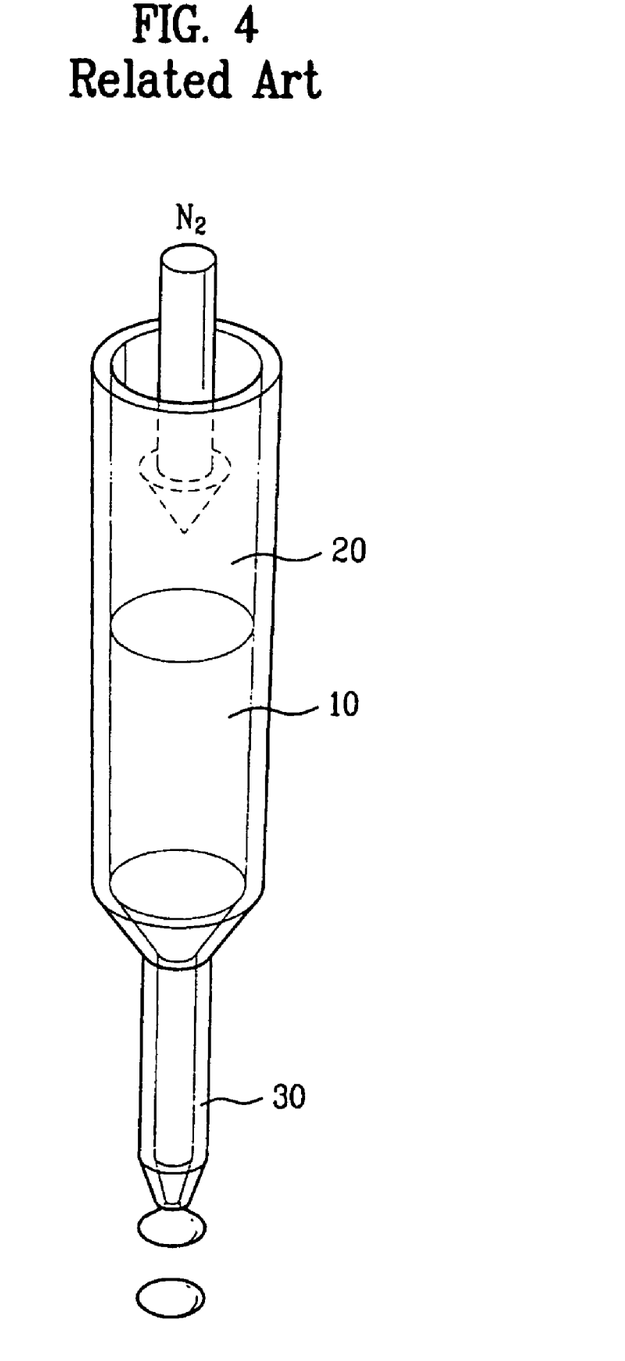
FIG. 4 is a schematic view of a liquid crystal drop apparatus according to the related art.

FIG. 4 is a schematic view of a liquid crystal drop apparatus according to the related art. As shown in FIG. 4, the related art liquid crystal drop apparatus includes a liquid crystal container 20 filled with liquid crystal 10, and a nozzle 30 connected to a lower end of the liquid crystal container 20 for dropping the liquid crystal 10 of the liquid crystal container 20.

Specifically, when nitrogen ($N_2$) gas is supplied to the liquid crystal container 20, a pressure of the nitrogen gas causes the liquid crystal 10 of the liquid crystal container 20 to be dropped on a substrate through the nozzle 30. The size of the liquid crystal drops on the substrate is determined by the surface tension of the liquid crystal 10 and the influence of gravity, and is adjusted by vertically moving the liquid crystal drop apparatus or changing the shape of the nozzle 30. In order to adequately display an image on the LCD device, it is necessary to precisely drop an adequate amount of the liquid crystal. However, since the surface tension of the liquid crystal 10 dropped from the nozzle 30 is determined by physical properties of the liquid crystal 10, the adjustment of the size of the liquid crystal drops by the related art methods is limited.

SUMMARY OF THE INVENTION

Accordingly, the present invention is directed to a liquid crystal drop apparatus and a method for dropping liquid crystal using the same that substantially obviate one or more problems due to limitations and disadvantages of the related art.

A first object of the present invention is to provide a liquid crystal drop apparatus, which is capable of finely adjusting the amount of liquid crystal dropped on a substrate, and a method for dropping the liquid crystal using the same, thereby improving a process margin.

Additional advantages, objects, and features of the invention will be set forth in part in the description which follows, and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a liquid crystal drop apparatus for dropping liquid crystal on a substrate includes a liquid crystal container filled with liquid crystal, a nozzle formed at a lower end of the liquid crystal container for dropping the liquid crystal of the liquid crystal container, and a control unit for controlling the nozzle when the nozzle drops the liquid crystal.

In another aspect of the present invention, a method for dropping liquid crystal on a substrate includes applying a sealant along an edge of the substrate, dropping liquid crystal from a nozzle of the liquid crystal container on a central portion of the substrate having the sealant applied thereto, and controlling the nozzle when the nozzle drops the liquid crystal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In manufacturing a liquid crystal display (LCD) device using a liquid crystal drop method, it is important to precisely control the position and the amount of dropping the liquid crystal to form a liquid crystal layer with a desired thickness. In particular, since the thickness of the liquid crystal layer is closely related to a cell gap, the position and the amount of the dropped liquid crystal determine the quality of the liquid crystal panel. Accordingly, a liquid crystal drop apparatus, which is able to drop a precise amount of the liquid crystal is required. The present invention aims to provide such a liquid crystal drop apparatus.

Figure 5:
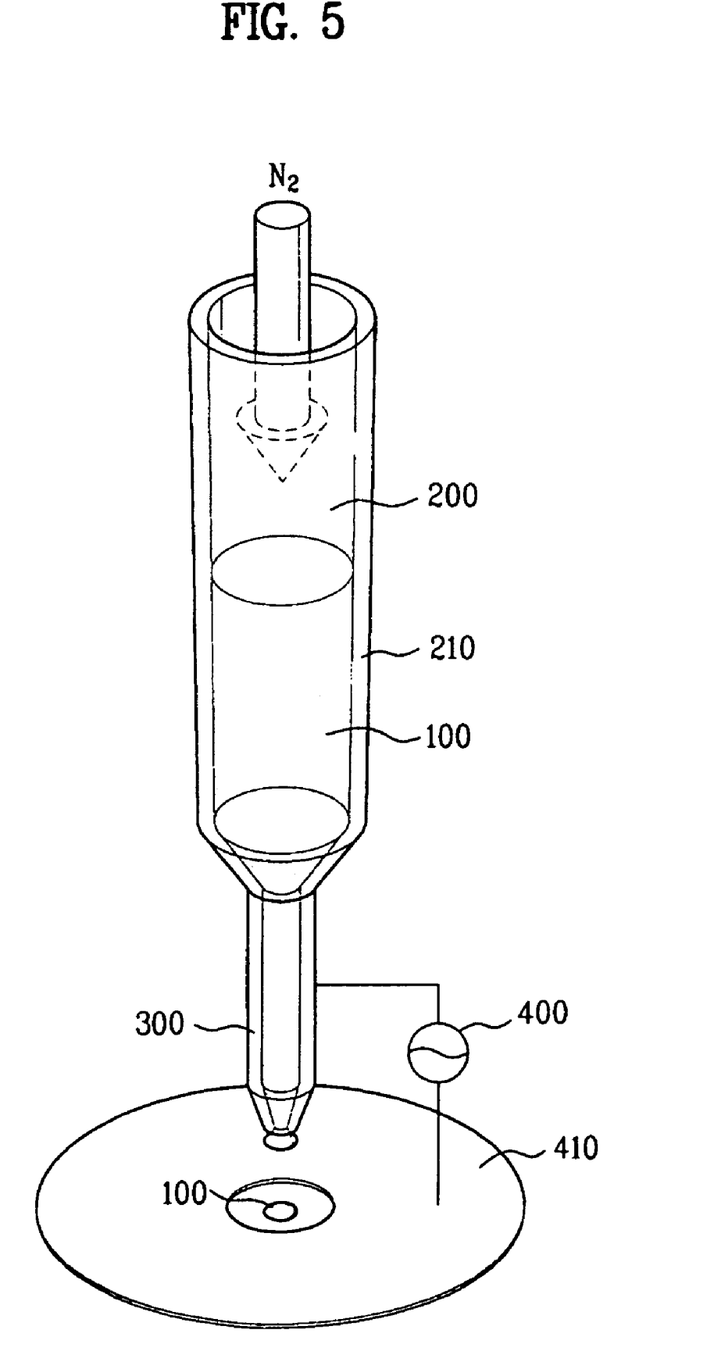
FIG. 5 is a schematic view of a liquid crystal drop apparatus in accordance with an exemplary embodiment of the present invention.

FIG. 5 is a schematic view of a liquid crystal drop apparatus in accordance with an exemplary embodiment of the present invention. As shown in FIG. 5, the liquid crystal drop apparatus of this exemplary embodiment includes a liquid crystal container 200 filled with liquid crystal 100, a nozzle 300 connected to a lower end of the liquid crystal container 200 for dropping the liquid crystal 100, and a control unit 400 for controlling the nozzle 300 when the nozzle 300 drops the liquid crystal 100. In this exemplary embodiment, the control unit 400 may be an electric field applying unit that is able to apply an AC or DC electric field to the nozzle 300 when the nozzle 300 drops the liquid crystal 100. Either an AC or DC electric field may be utilized. Since the DC electric field causes wide dispersion of the dropped liquid crystal due to Rayleigh instability of surface charge of the dropped liquid crystal, it is preferable to utilize the AC electric field. That is, when the AC electric field is used, the Rayleigh instability of the surface charge of the dropped liquid crystal can be reduced, thereby narrowly dispersing the dropped liquid crystal.

The electric field applying unit 400 has one end connected to the nozzle 300 and has the other end connected to an electrode 410. The electrode 410 serves to apply a DC or AC voltage from the outside to the liquid crystal drop apparatus. Thus, an AC electric field is generated between the electric field applying unit 400 and the nozzle 300.

When nitrogen ($N_2$) gas is supplied to the liquid crystal container 200, a pressure of the nitrogen gas causes the liquid crystal 100 in the liquid crystal container 200 to be dropped on substrates through the nozzle 300. At this time, the nozzle 300 drops the liquid crystal 100 by the AC electric field generated between the nozzle 300 and the electric field applying unit 400, thereby reducing the size of the liquid crystal drops. In general, the substrates are arranged at regular intervals in the directions of X and Y axes. Thus, when the liquid crystal 100 is dropped on the substrates, the substrates may be fixed while the liquid crystal drop apparatus may move in the directions of X and Y axes to drop the liquid crystal 100 at regular intervals. In this exemplary embodiment, the liquid crystal drop swings by the movement of the liquid crystal drop apparatus, thereby causing errors in the position or the amount of the liquid crystal 100 dropped on the substrates. For this reason, it is preferable to fix the liquid crystal drop apparatus and move the substrates.

In order to reduce the size of the liquid crystal drops on the substrate, the liquid crystal drop apparatus of the exemplary embodiment applies an electric field to the nozzle 300. That is, the nozzle 300 is uniformly vibrated by the AC electric field applied thereto, thereby allowing a drop of the liquid crystal 100 formed at the tip of the nozzle 300 to fall with a smaller size on the substrate, compared to the related art liquid crystal drop apparatus.

The liquid crystal container 200 is installed in a case 210 and is filled with the liquid crystal 100. The liquid crystal container 200 may be made of polyethylene, and the case 210 may be made of a metal material, such as stainless steel. Polyethylene, which typically has excellent plasticity, is easily formed into a container with a desired shape. Moreover, since polyethylene does not react with the liquid crystal 100, polyethylene is mainly utilized as a material for the liquid crystal container 200. However, polyethylene has low strength, and is easily damaged even by an external weak impact. Accordingly, when the liquid crystal container 200 is made of polyethylene, the liquid crystal container 200 may be deformed, thereby making difficult to obtain a precise dropping position for the liquid crystal 100. For this reason, in the exemplary embodiment, the liquid crystal container 200 made of polyethylene is contained in the case 210 made of stainless steel with high strength. Although not shown in the drawings, a gas supply pipe connected to an external gas supply unit is installed on the liquid crystal container 200. Gas, such as nitrogen ($N_2$) gas, is supplied from the external gas supply unit to the liquid crystal container 200 through the gas supply pipe, thereby filling a portion of the liquid crystal container 200. The gas is not filled with the liquid crystal 100, thereby applying pressure to the liquid crystal 100 to drop the liquid crystal 100 on the substrates.

On the other hand, the liquid crystal container 200 may be made of a metal material, such as stainless steel. In this case, since the metal liquid crystal container 200 can avoid damages from external impact, the case 210 is not needed. Thus, it is possible to reduce production costs of the liquid crystal drop apparatus. In case that the liquid crystal container 200 is made of a metal material, in order to prevent the liquid crystal 100 of the liquid crystal container 200 from chemically reacting with the metal, it is preferable to apply a fluorine resin film to the inner surface of the liquid crystal container 200.

Figure 6:
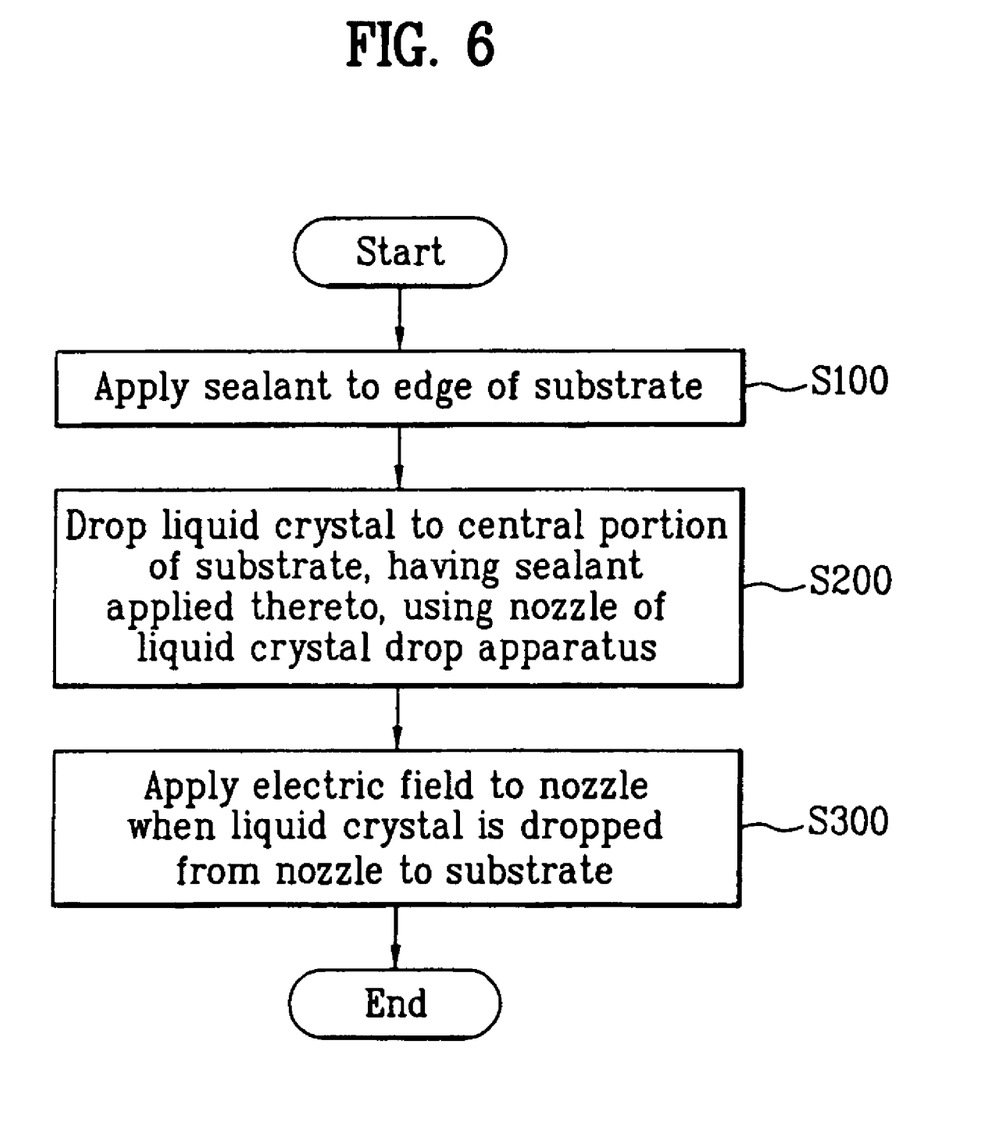
FIG. 6 is a flow chart schematically illustrating a method for dropping liquid crystal using the liquid crystal drop apparatus of FIG. 5.

Hereinafter, a method, according to an exemplary embodiment, for dropping liquid crystal using the above liquid crystal drop apparatus will be described. FIG. 6 is a flow chart schematically illustrating the method for dropping liquid crystal using the liquid crystal drop apparatus of the present invention. As shown in FIG. 6, the exemplary method includes at least three Steps of S100, S200 and S300.

At Step S100, a sealant may be applied along the edge of either a TFT array substrate or a color filter array substrate. In case that the sealant is applied along the edge of the TFT array substrate, the TFT array substrate may be formed with a plurality of gate lines and a plurality of data lines intersecting each other for defining pixel regions, TFTs formed at the intersections of the gate lines and the data lines, and pixel electrodes connected to the TFTs and formed in the pixel regions. Moreover, each TFT further includes a gate electrode, a gate insulating film, a semiconductor layer, an Ohmic contact layer, source/drain electrodes, and a passivation film. An orientation film for initially orienting liquid crystal is formed on the pixel electrodes. Here, the orientation film is formed by rubbing a material, such as a polyamide or polyimide group compound, polyvinyl alcohol (PVA), or polyamic acid, or by applying light to a photo reactive material, such as a polyvinyl cinnamate (PVCN), polysiloxane cinnamate (PSCN) or cellulose cinnamate (CelCN) group compound. When the sealant is applied along the edge of the color filter array substrate, the color filter array substrate may be formed with a light shading film for preventing light from leaking at regions for the gate lines, the data lines and the TFTs, an R, G, and B color filter layer on the light shading film, and a common electrode on the color filter layer. Moreover, an overcoat layer may be formed between the color filter layer and the common electrode, and the above orientation film may be formed on the common electrode.

The TFT array substrate is applied with Ag in dot shapes, thereby allowing voltage to be applied to the common electrode on the color filter array substrate after the TFT array substrate and the color filter array substrate are bonded to each other. In an In Plane Switching (IPS) mode liquid crystal display device, the common electrode and pixel electrodes are formed on the same lower substrate for forming a horizontal electric field, and Ag dots are not applied to the substrate.

The sealant, which is applied to the edge of either the TFT array substrate or the color filter array substrate, serves to prevent the liquid crystal from leaking to the outside and to bond the two substrates to each other. In this exemplary embodiment, a thermosetting sealant, such as an epoxy sealant, may be utilized. The sealant may be applied to the substrate by either a screen printing method or a dispensing method.

The screen printing method is convenient, and therefore is commonly utilized. In the screen printing method, the sealant is applied to the entire surface of a mask having openings, and a rubber rod is rotated on the mask, which is located on a substrate, in one direction, thereby applying the sealant to regions of the substrate corresponding to the openings of the mask. On the other hand, in the dispensing method, a stage on which a substrate is loaded moves in all directions, and a sealant container filled with a sealant dispenses the sealant onto the substrate by a designated pressure, thereby applying the sealant to the edge of the substrate.

Thereafter at Step S200, the nozzle 300 attached to the liquid crystal container 200 filled with the liquid crystal 100 drops the liquid crystal 100 at the central portion of the substrate to which the sealant is applied.

Then, at Step 300, when the nozzle 300 drops the liquid crystal 100 on the substrate, an electric field is applied to the nozzle. When the electric field is applied to the nozzle 300, the size of the liquid crystal drops is finely adjusted by varying the intensity of the electric field and the intensity of frequency. Thus, since the liquid crystal drop having a fine size falls on the substrate, the amount of the liquid crystal 100 dropped on the substrate can be precisely controlled.

Figure 7A:
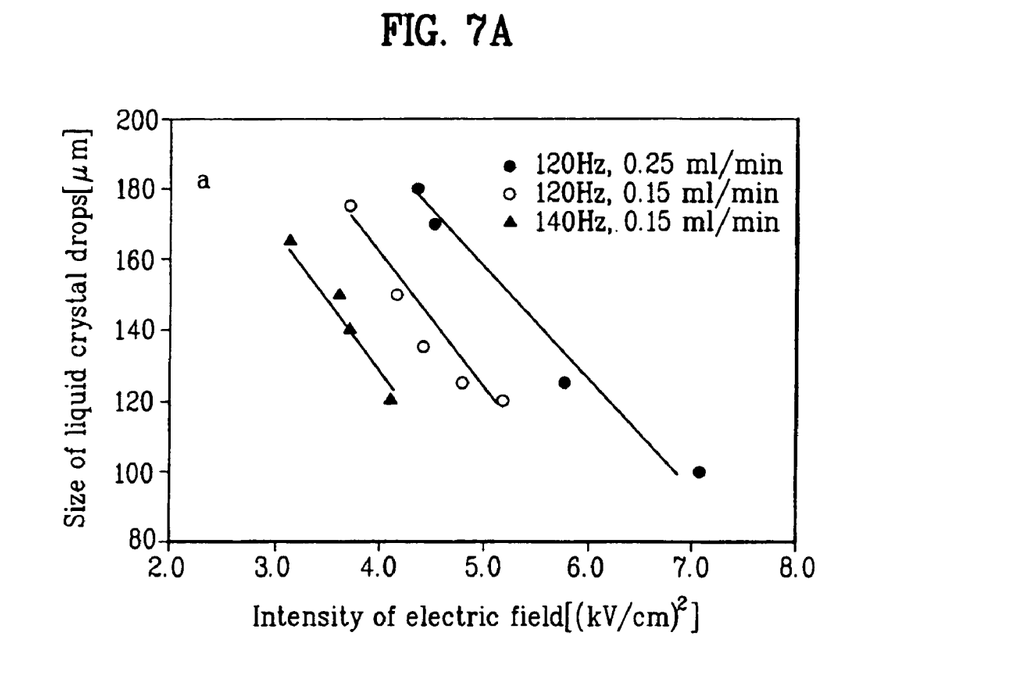
FIGS. 7A and 7B are graphs schematically illustrating variation of the size of liquid crystal drops according to variation of the intensity of an electric field applied to a nozzle of the liquid crystal drop apparatus of FIG. 5.
Figure 7B:
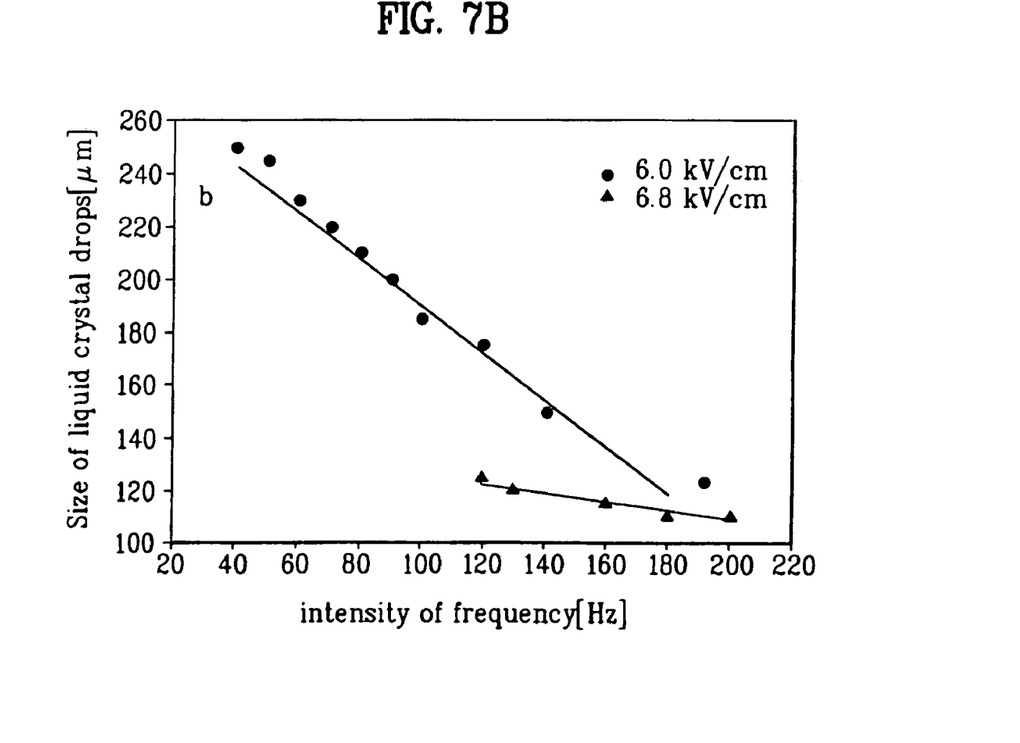

FIG. 7A is a graph schematically illustrating variation of the size of liquid crystal drops according to variation of the intensity of an electric field applied to the nozzle 300. FIG. 7B is a graph schematically illustrating variation of the size of liquid crystal drops according to variation of the intensity of a frequency applied to the nozzle 300. As shown in FIG. 7A, the higher the intensity of the electric field is, the smaller the size of the liquid crystal drops is. Also, as shown in FIG. 7B, the higher the intensity of the frequency is, the smaller the size of the liquid crystal drops is. Accordingly, since the size of the liquid crystal drops can be freely adjusted by varying the intensity of the electric field or the frequency, it is possible to finely and precisely control the amount of the liquid crystal dropped on the substrate.

As described above, a liquid crystal drop apparatus and a method for dropping liquid crystal using the same in accordance with the exemplary embodiments of the present invention have the following advantages. First, since an electric field is applied to a nozzle so that a liquid crystal drop formed at the tip of the nozzle falls with a small size on a substrate, the small amount of the liquid crystal is dropped on the substrate and a process margin of the amount of the dropped liquid crystal is improved, thereby improving the quality of the LCD device. Second, since the size of the liquid crystal drops on the substrate can be adjusted according to the intensity of the electric field or frequency applied to the nozzle, the amounts of the liquid crystal dropped on the respective positions of the substrate corresponding to liquid crystal panels are different, thereby increasing a process speed.

It will be apparent to those skilled in the art that various modifications and variations can be made in the liquid crystal drop apparatus and the method for dropping liquid crystal using the same of the present invention without departing from the spirit or scope of the inventions. Thus, it is intended that the present invention covers the modifications and variations of this invention provided they come within the scope of the appended claims and their equivalents.

What is claimed is:

1. A method for dropping liquid crystal in a liquid crystal container on a substrate comprising:
    applying a sealant along an edge of the substrate;
    dropping the liquid crystal from a nozzle of the liquid crystal container on a central portion of the substrate having the sealant applied thereto; and
    applying an electric field between an electrode and the nozzle when the nozzle drops the liquid crystal,
    herein applying an electric field includes using an electric field applying unit which has one end connected directly to the nozzle and has the other end connected directly to the electrode to apply an electric field to the nozzle, wherein an intensity of the electric field applied to the nozzle is adjusted.

2. The method according to claim 1, wherein the electric field applied to the nozzle is an AC electric field.

3. The method according to claim 1, wherein controlling the nozzle includes using an electric field applying unit to apply a frequency to the nozzle.

4. The method according to claim 3, wherein an intensity of the frequency applied to the nozzle is adjusted.

* * * * *